US012600013B2

(12) United States Patent
Kouros

(10) Patent No.: US 12,600,013 B2
(45) Date of Patent: Apr. 14, 2026

(54) MITER CLAMP TOOL ASSEMBLY AND METHOD

(71) Applicant: KOUROS CARPENTRY CORP, Burr Ridge, IL (US)

(72) Inventor: Dino Kouros, Burr Ridge, IL (US)

(73) Assignee: KOUROS CARPENTRY CORP, Burr Ridge, IL (US)

( * ) Notice: Subject to any disclaimer, the term of this patent is extended or adjusted under 35 U.S.C. 154(b) by 0 days.

(21) Appl. No.: 19/222,716

(22) Filed: May 29, 2025

(65) Prior Publication Data

US 2025/0289096 A1 Sep. 18, 2025

Related U.S. Application Data

(63) Continuation of application No. PCT/US2023/082319, filed on Dec. 4, 2023.

(60) Provisional application No. 63/430,928, filed on Dec. 7, 2022.

(51) Int. Cl.
*B25B 5/14* (2006.01)
*B25B 5/08* (2006.01)

(52) U.S. Cl.
CPC ................ *B25B 5/142* (2013.01); *B25B 5/08* (2013.01)

(58) Field of Classification Search
CPC ................................. B25B 5/142; B25B 5/08
See application file for complete search history.

(56) References Cited

U.S. PATENT DOCUMENTS 3,456,973 A * 7/1969 Erwin ........................ F16B 5/00 403/402
3,893,362 A * 7/1975 Schneider ................ B27G 5/02 83/827
4,021,516 A * 5/1977 Stevenson ............... B25B 5/142 269/239
4,236,703 A * 12/1980 Stevenson ............... B25B 5/142 269/53
5,573,228 A * 11/1996 Chestnut ................. B25B 5/142 269/41
5,975,790 A * 11/1999 Nogami ................ E04G 17/001 403/384
8,572,827 B1 * 11/2013 Chou .................. E04F 21/0053 227/155

(Continued)

OTHER PUBLICATIONS

International Preliminary Report on Patentability for Application No. PCT/US2023/082319 dated Jun. 10, 2025.

*Primary Examiner* — Seahee Hong
(74) *Attorney, Agent, or Firm* — MARSHALL, GERSTEIN & BORUN LLP

(57) ABSTRACT

A miter clamp tool assembly including a base having a first clamp member and a second clamp member. A first plate is disposed on the first clamp member and a second plate is disposed on the second clamp member, and the second plate configured to move from a first position to a second position. Each of the first and second plates including a plurality of screws configured to be coupled to a portion of a workpiece. A lever is disposed on the second clamp member and configured to contact the second plate when the lever is actuated to move the second plate from the first position to the second position. A top member is disposed on the base to enclose the first and second plates and the lever, with a portion of the lever extending from the second clamp member for actuation.

8 Claims, 10 Drawing Sheets

(56) References Cited

U.S. PATENT DOCUMENTS

2008/0258368 A1* 10/2008 Kinnison ................ B25B 5/142
269/41

* cited by examiner

MITER CLAMP TOOL ASSEMBLY AND METHOD

CROSS-REFERENCE TO RELATED APPLICATIONS

The present application is a continuation of PCT International Application No. PCT/US23/82319, filed on Dec. 4, 2023, which claims priority to U.S. Provisional Application No. 63/430,928, filed Dec. 7, 2022, which is hereby incorporated by reference in its entirety.

TECHNICAL FIELD

The present disclosure relates to tools for securing parts during construction and, more specifically, to a new miter clamp tool assembly and method for securing workpieces together, such as moldings.

BACKGROUND

It is known to use a miter tool to secure parts, such as two molded pieces, and some conventional miter clamp tool devices are used in the construction industry. However, such conventional miter clamp tool devices are typically made of metal with brass parts and, therefore, are heavier to use, reducing both the adaptability and flexibility of the conventional miter tools in various applications. In addition, conventional miter clamp tools include an actuating member disposed on a top portion of the housing and a pivot point, such that the actuating member upwardly extends from the top portion of the housing and rotates about the pivot point to operate the miter clamp tool. However, having the actuating member disposed on the top portion of the housing also limits the flexibility of the conventional miter clamp tool, as it may only be disposed on a surface allowing the actuating member on the top to be exposed, for example. Such limitations have reduced the value of conventional devices, making them less desirable and often unworkable in many areas of the construction industry.

SUMMARY

In accordance with a first exemplary aspect, a miter clamp tool assembly comprise a base having a first clamp member and a second clamp member, and a first plate disposed on the first clamp member and a second plate disposed on the second clamp member. The second plate is configured to move from a first position to a second position, and each of the first and second plates including a plurality of screws configured to be coupled to a portion of a workpiece to secure the portions of the workpieces together. A lever is disposed on the second clamp member adjacent to the second plate and configured to contact the second plate when the lever is actuated to move the second plate from the first position to the second position. Further, a top member is disposed on the base to enclose the first and second plates and a portion of the lever, with a portion of the lever extending from the second clamp member between the base and the top member, the portion for actuation.

In accordance with a second exemplary aspect, a miter clamp tool assembly comprises a base having a first clamp member and a second clamp member, and a spring-biased plate disposed on the second clamp member and configured to move from a first position to a second position. The spring-biased plate includes a plurality of screws configured to be coupled to a portion of a workpiece to secure the portion of the workpiece to another portion of a workpiece. In addition, a lever is disposed on the second clamp member adjacent to the second plate and configured to contact the second plate when the lever is actuated to move the second plate from the first position to the second position. Further, a top member is disposed on the base to enclose the spring-biased plate, and the is lever disposed between the base and the top member.

A method of securing workpieces together using a miter clamp tool assembly comprises aligning a first workpiece with a first clamping member of the miter tool clamp assembly and a second workpiece with a second clamping member of the miter tool clamp assembly, and moving a lever of the miter tool clamp assembly from an unactuated position to an actuated position. The method also includes moving a spring-biased plate of the second clamping member from a first position to a second position upon moving the lever of the miter tool clamp assembly from the unactuated position to the actuated position. The method further includes engaging a plurality of screws disposed on the spring-biased plate with a portion of a second workpiece and a plurality of screws disposed on a first plate of the first clamping member with a portion of the first workpiece to secure the first workpiece to the second workpiece.

Any one or more of these aspects may be considered separately and/or combined with each other in any functionally appropriate manner. In addition, any one or more of these aspects may further include and/or be implemented in any one or more of the optional exemplary arrangements and/or features described hereinafter. These and other aspects, arrangements, features, and/or technical effects will become apparent upon detailed inspection of the figures and the following description.

BRIEF DESCRIPTION OF THE DRAWINGS

The features of this disclosure which are believed to be novel are set forth with particularity in the appended claims. The present disclosure may be best understood by reference to the following description taken in conjunction with the accompanying drawings, in which like reference numerals identify like elements in the several figures, and in which:

DETAILED DESCRIPTION

A miter clamp tool assembly includes a base having a first clamp member and a second clamp member disposed perpendicular to the first clamp member in one example. A first plate is disposed on the first clamp member and a second plate is disposed on the second clamp member. In addition, each of the first and second plates includes a plurality of screws. Each of the plurality screws is configured to be attached to portion of a workpiece to secure the portions of the workpieces together. A lever is disposed on the second clamp member adjacent to the second plate and is configured to contact the second plate when the lever is moved from an unactuated state to an actuated state. Further, a top member is disposed on the base to enclose the first and second plates, and the lever is disposed between the top member and the base, with a portion of the lever extending outwardly from the base to enable actuation of the lever.

Figure 1:
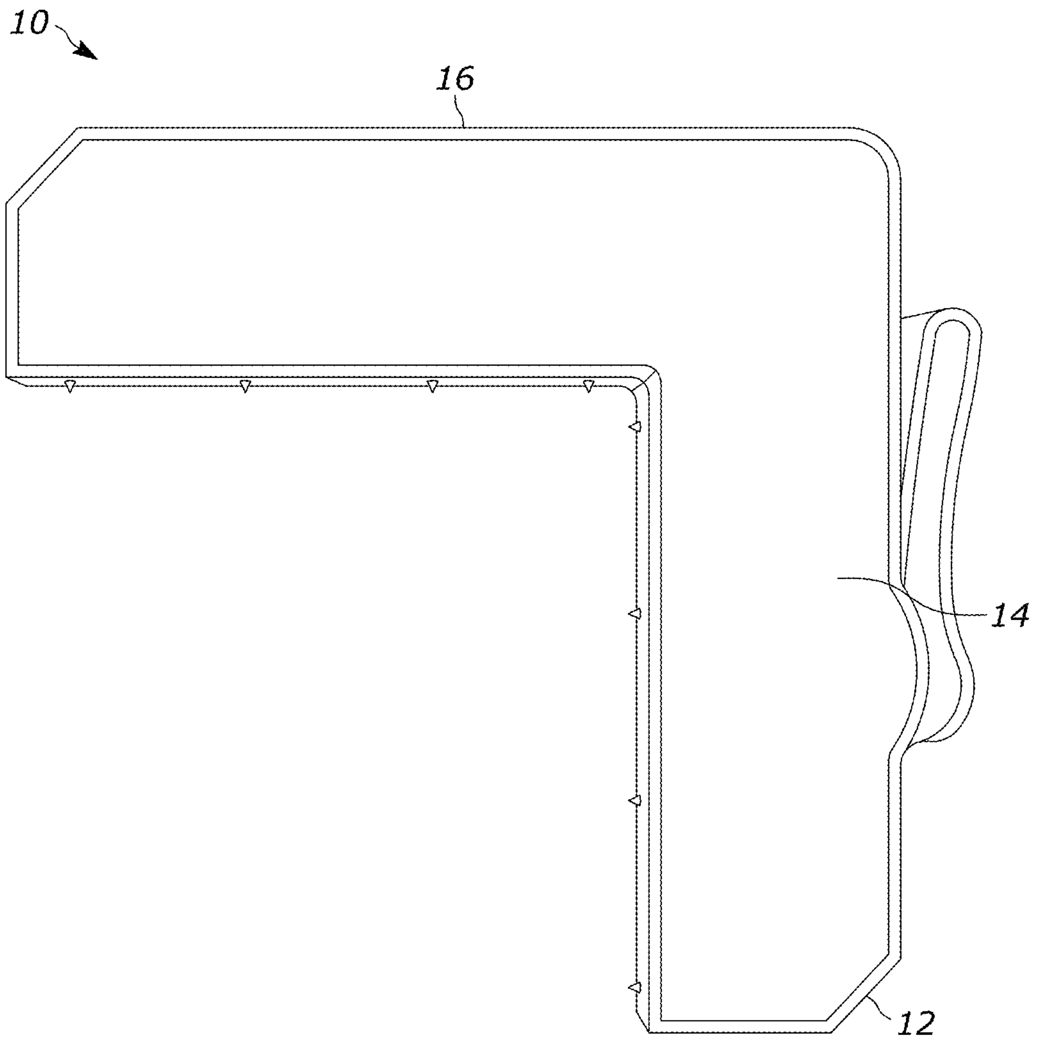
FIG. 1 is a top view of a miter clamp tool assembly according to an aspect of the present disclosure.
Figure 2:
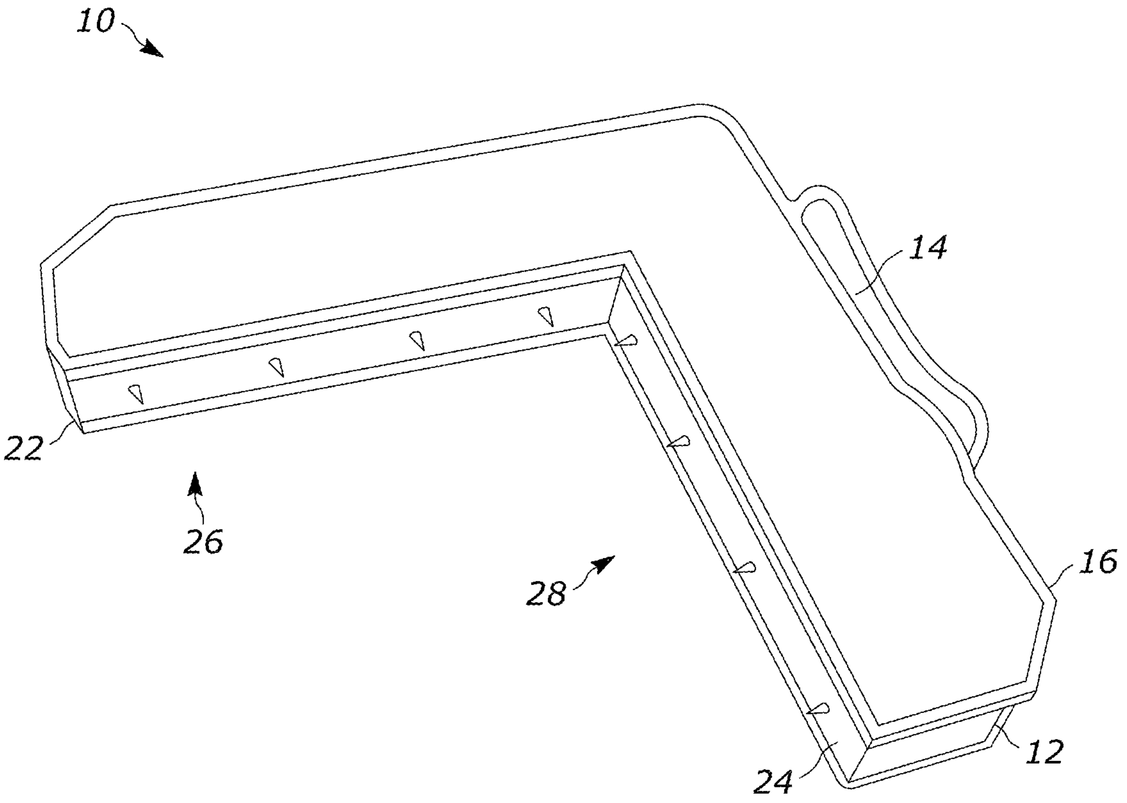
FIG. 2 is a perspective view of the miter clamp tool assembly of FIG. 1.

Referring now to FIGS. 1 and 2, a miter clamp tool assembly 10 of the present disclosure is depicted. The miter clamp tool assembly 10 includes a base 12, a lever 14 disposed on the base 12, and a top member 16 disposed on the base 12. The lever 14 is thus disposed between the base 12 and the top member 16, with a portion of the lever 14 extending outwardly from the base 12 to allow actuation of the lever 14, as explained more below. While a lever 14 is depicted in FIGS. 1 and 2 and throughout several figures, it will be understood that an a different actuating member may alternatively be used that functions in essentially the same way as the lever 14 of FIGS. 1 and 2 (as explained more below) and still fall within the scope of the present disclosure.

Figure 3:
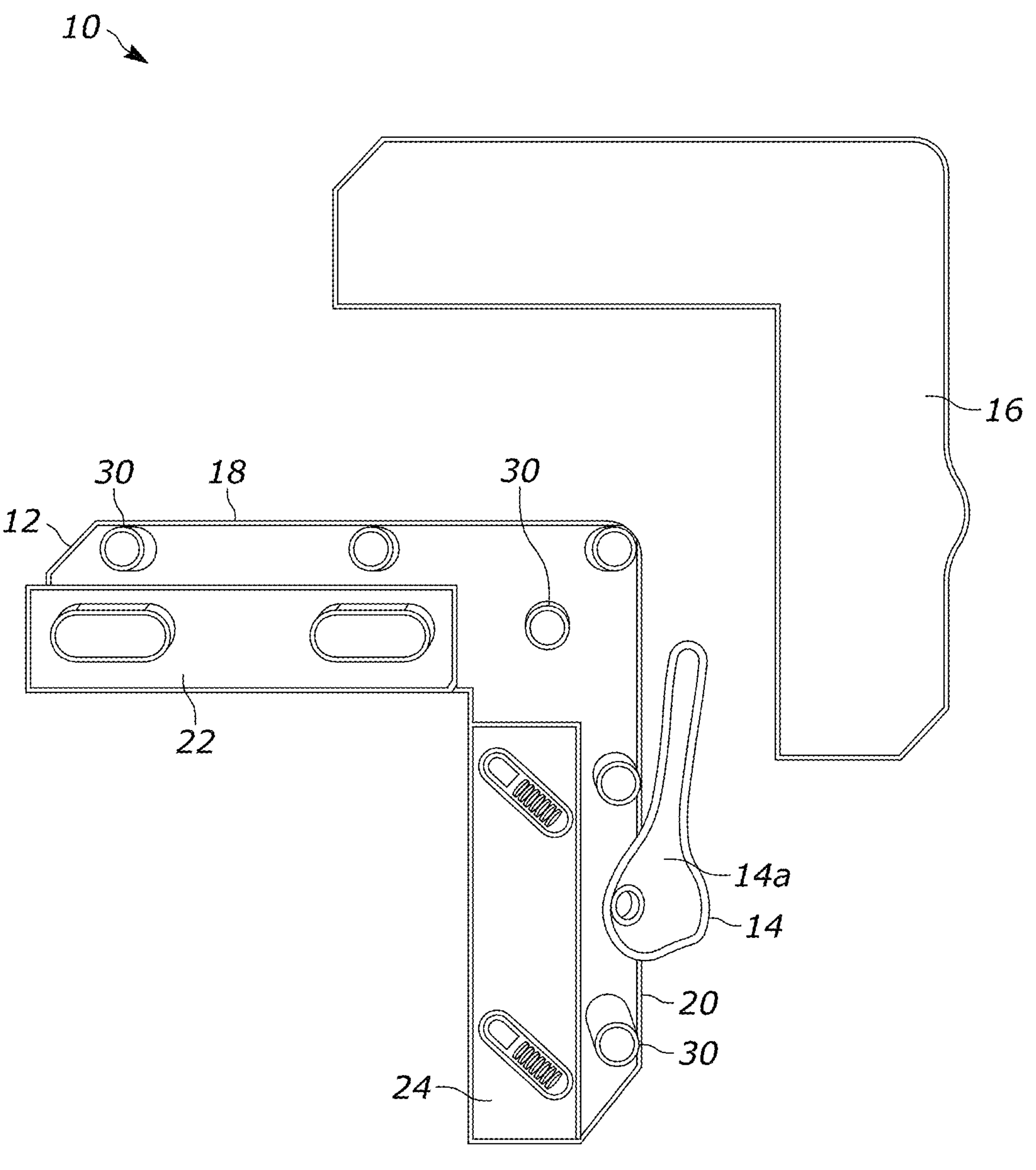
FIG. 3 is an exploded view of the miter clamp tool assembly of FIGS. 1 and 2.

Referring now to FIG. 3, a partially exploded view of the miter clamp tool assembly 10 of FIGS. 1 and 2 is depicted, with the top member 16 removed from the base 12 of the miter clamp tool assembly 10. The base 12 includes a first clamp member 18 and a second clamp member 20. In one example, the second clamp member 20 is disposed perpendicular to the first clamp member 18. In another example, and as depicted in FIG. 3, the second clamp member 20 is integral with the first clamp member 18, forming a single piece for the base 12.

Figure 4:
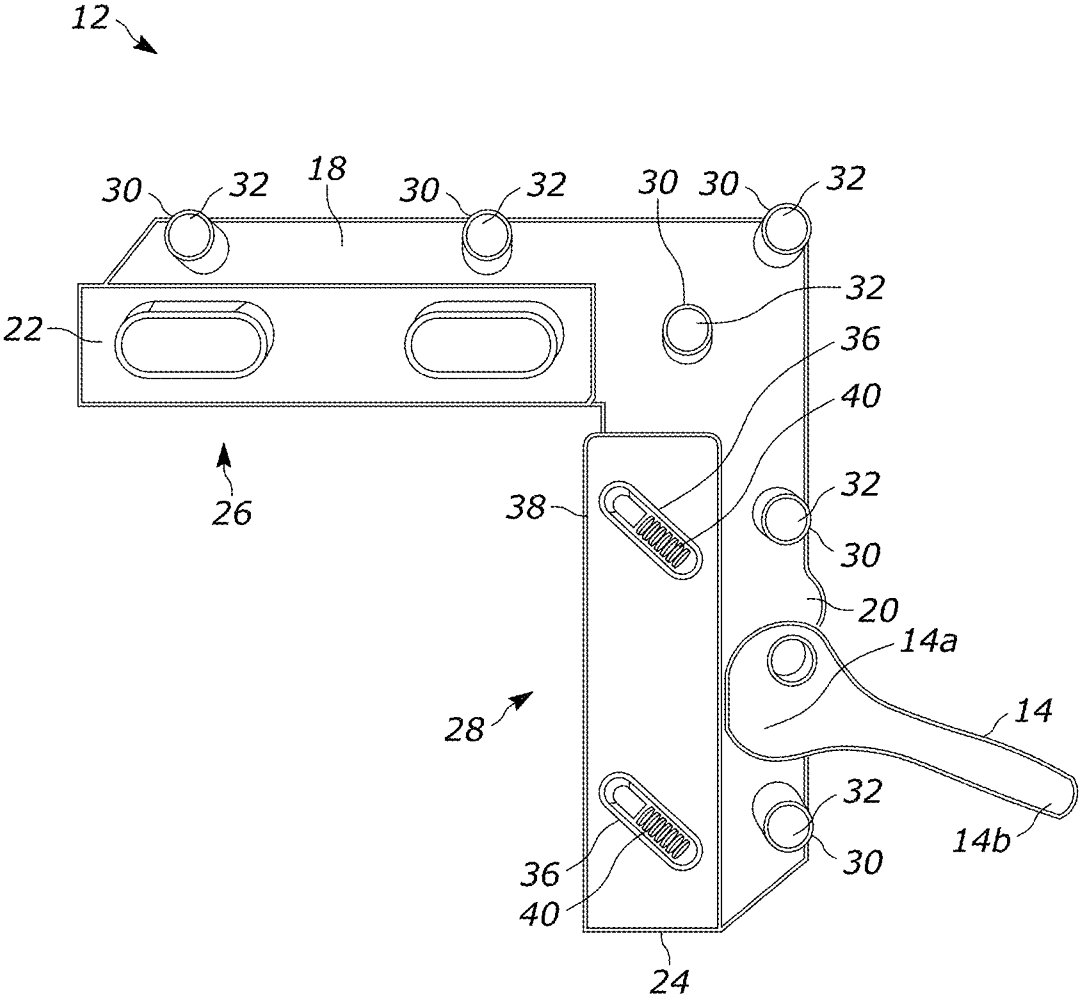
FIG. 4 is a top view of a base of the miter clamp tool assembly.

A first plate 22 is disposed on the first clamp member 18 and a second plate 24, which may be a spring-biased plate as explained more below, is disposed on the second clamp member 20. The second plate 24 is configured to move from a first position, which is depicted in FIG. 3, to a second position, which is depicted in FIG. 4 upon actuation of the lever 14, as also explained more below. In one example, the first position of the second plate 24 is a position in which the second plate 24 is immediately disposed on the second clamp member 20 of the base 12 and no portion of the second plate 24 extends outwardly and/or outside of the second clamp member 20 of the base 12. In addition, the second position of the second plate may be a position in which the second plate 24 is moved from the first position, such that at least a portion of the second plate 24 extends outwardly from and outside of the second clamp member 20 of the base 12, as depicted in FIG. 4.

As further depicted in FIG. 3 (and also FIG. 2), each of the first and second plates 22, 24 includes a plurality of screws 26, 28, respectively, configured to be coupled to a portion of a workpiece to secure the portions of the workpieces together. In one example, the plurality of screws 26 of the first plate 22 and the plurality of screws 28 of the second plate 24 both include four screws equally spaced apart from each other. It will be appreciated that more or fewer than four screws may alternatively be used for either of the plurality of screws 26, 28 and still fall within the scope of the present invention, as explained more below.

Further, the lever 14 is disposed on the second clamp member 20 adjacent to the second plate 24. In addition, the lever 14 is configured to contact the second plate 24 when the lever 14 is rotatably actuated to move the second plate 24 from the first position to the second position. Specifically, the lever 14 includes a cam 14*a* that contacts the second plate 24 when the lever 14 is actuated, as depicted in FIG. 4.

Referring now to FIG. 4, each of the first and second clamp members 18, 20 includes at least one post 30 having a bore 32. In one example, and as depicted in FIG. 3, the first clamp member 18 includes four posts 30 and the second clamp member 20 includes two posts 30, with each of the posts 30 also including the bore 32. It will be appreciated that more or fewer than six posts 30 of the first and second clamp members 18, 20 may alternatively be used and still fall within the scope of the present disclosure.

Figure 5:
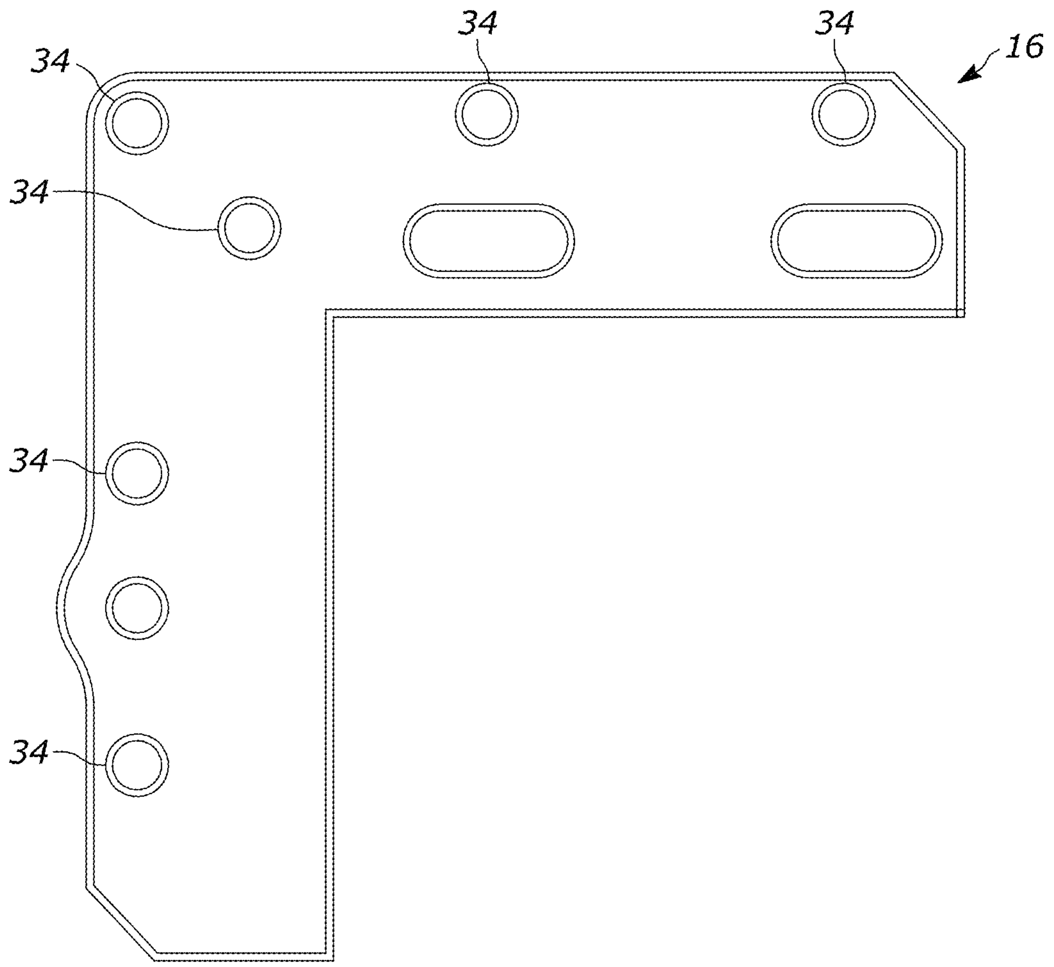
FIG. 5 is a bottom perspective view of a top member of the miter clamp tool assembly.

Referring now to FIG. 5, the top member 16 further includes at least one projection 34 configured to be disposed within the bore 32 of the at least one post 30 to secure the top member 16 to the base 12 of the miter clamp tool assembly 10. In another example, the top member 16 may include six projections 34, each of which is configured to be disposed in one of the bores 32 of the posts 30 of the first and second clamp members 18, 20 of the base 12 to secure the top member 16 to the base 12. It will be appreciated that more or fewer than six projections 34 of the top member 16 may alternatively be used and still fall within the scope of the present disclosure.

Referring back to FIGS. 3 and 4, the second plate 24 may further include a pair of elongated openings 36. Each elongated opening 38 of the pair of elongated openings 36 has a spring-biased member 40 that biases the second plate 24 back into the first position after movement into the second position, for example. In FIG. 3, the second plate 24 is depicted in the first position. This is a position in which the plurality of screws 26, 28 of each of the first and second plates 22, 24 are not engaged and/or even in contact with the portion of the workpiece. In addition, when the second plate 24 is in the first position, the lever 14 is in the unactuated state. Further, and as mentioned, the first position of the second plate 24 is the position in which the second plate 24 is immediately disposed on the second clamp member 20 of the base 12 and no portion of the second plate 24 extends outwardly and/or outside of the second clamp member 20 of the base 12.

FIG. 4 depicts the second plate 24 in the second position. More specifically, the second position is the position in which the plurality of screws 26, 28 of each of the first and second plates 22, 24 are engaged with the portion of the workpiece to join the two portions of the workpieces together, for example. In addition, when the second plate 24 is in the second position, the lever 14 is in the actuated state. Further, and as explained above, the second position of the second plate 24 includes a position in which the second plate 24 is moved from the first position, such that at least a portion of the second plate 24 extends outwardly from and outside of the second clamp member 20 of the base 12.

Figure 6:
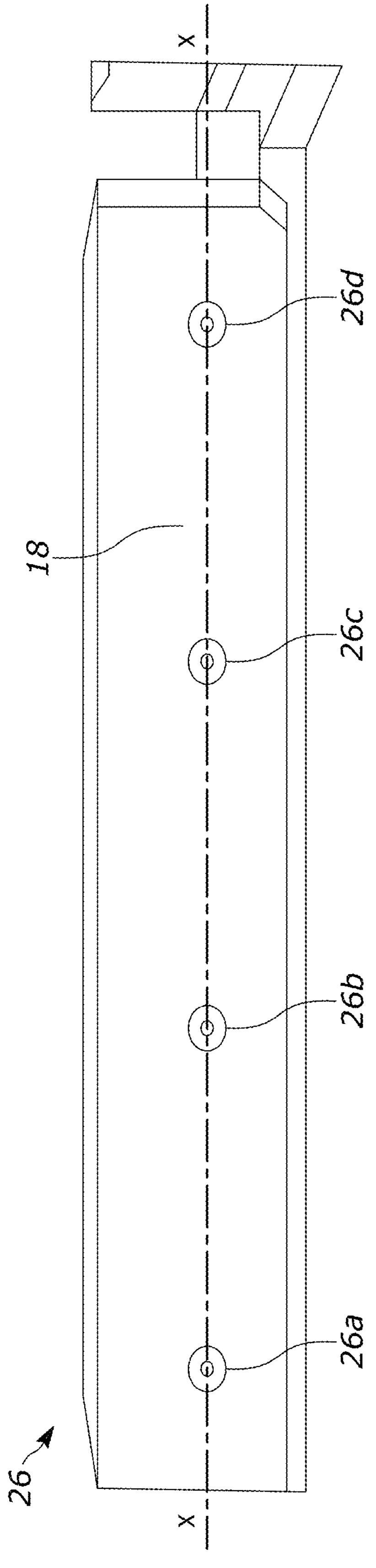
FIG. 6 is a front perspective view of a first clamp member of the base of the miter clamp tool assembly of the present disclosure.

Referring now to FIG. 6, a close-up, front view of the first clamp member 18 is depicted. In this example, the plurality of screws 26 of the first plate 22 includes four screws 26*a*, 26*b*, 26*c*, and 26*d* disposed along a central axis X of the first plate 22. It will be appreciated that the plurality of screws 26 of the first plate 22 may alternatively be disposed offset from the central axis X of the first plate 22 to accommodate different thicknesses of the portion of the workpiece to which the plurality of screws 26 engage, for example, and again still fall within the scope of the present disclosure.

Figure 7:
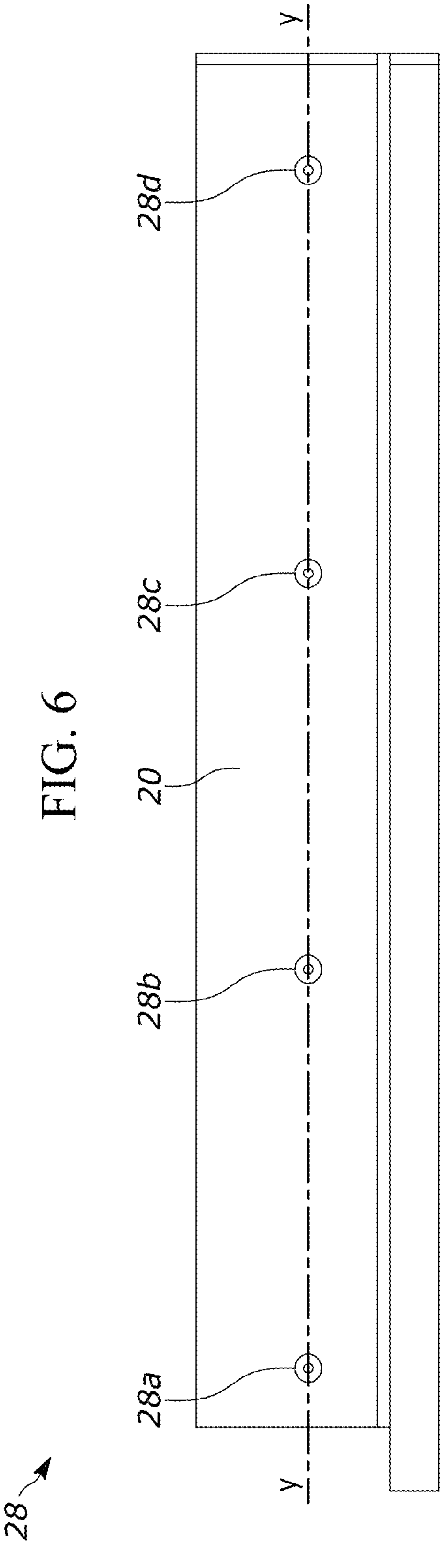
FIG. 7 is a front perspective view of a second clamp member of the base of the miter clamp tool assembly of the present disclosure.

Referring now to FIG. 7, a close-up front view of the second clamp member 20 is depicted. In this example, the plurality of screws 28 of the second plate 24 also includes four screws 28*a*, 28*b*, 28*c* and 28*d* equally spaced apart from each other. However, the plurality of screws 28 are offset from a central axis Y of the second plate 24. The plurality of screws 28 of the second plate 24 are disposed offset from the central axis Y of the second plate to accommodate different thicknesses and sizes of the portions of the workpieces, such as different sized moldings. It will also be appreciated that the plurality of screws 28 may alternatively be disposed along the central axis Y of the second plate 24 and also still fall within the scope of the present disclosure.

Figure 8:
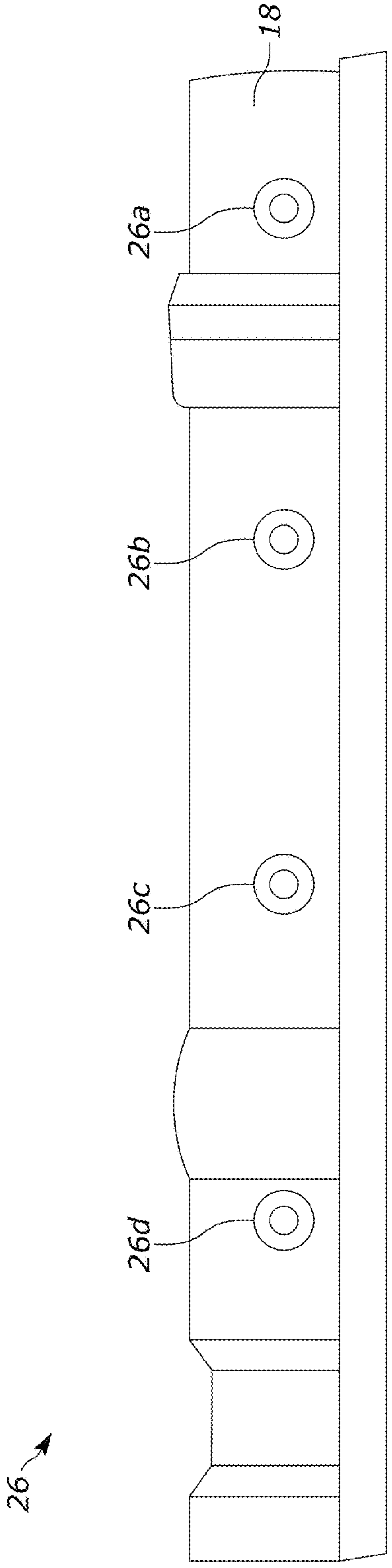
FIG. 8 is rear perspective view of the first clamp member of the base of the miter clamp tool assembly of the present disclosure.

Referring now to FIG. 8, a rear perspective view of the first clamp member 18 of the 12 base of the miter clamp tool assembly 10 is depicted. The four screws 26*a*-26*d* of the plurality of screws 26 are depicted and, in particular, top portions of the four screws 26*a*-26*d* are depicted. Each 26*a*, 26*b*, 26*c*, 26*d* screw of the plurality of screws 26 may be adjusted, such that more or less of a tip of the at least one screw 26*a*-26*d* extends from the side of the first plate 22 to again accommodate different thicknesses and sizes of workpieces to which the screws of the plurality of screws 26 engage.

Figure 9:
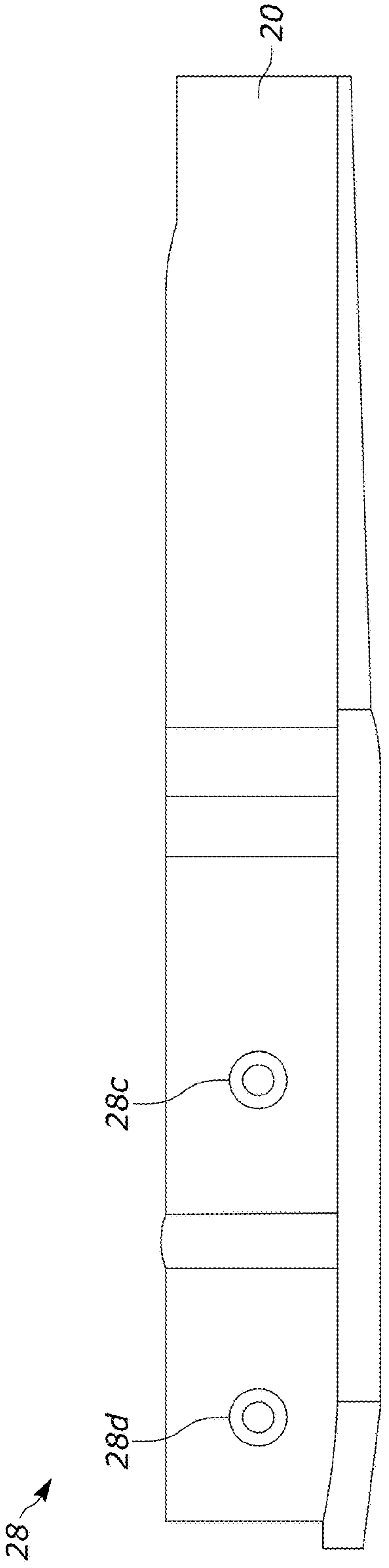
FIG. 9 is a rear perspective view of the second clamp member of the base of the miter clamp tool assembly of the present disclosure.

Referring now to FIG. 9, and in a similar manner, a rear perspective view of the second clamp member 20 of the base 12 of the miter clamp tool assembly 10 is depicted. Two 28*c*, 28*d* of the four screws 28*a*-28*d* of the plurality of screws 28 are depicted and, in particular, top portions of the two screws 28*c*, 28*d* are depicted. Each screw 28*a*-28*d* of the plurality of screws 28 may also be adjusted, such that more or less of a tip of the least one screw of the plurality of screws 28 extends from the side of the second plate 24. In this way, the miter clamp tool assembly 10 is flexible and adaptable to various thicknesses and sizes of workpieces to which the screws 28*a*-28*d* of the plurality of screws 28 will engage.

Figure 10:
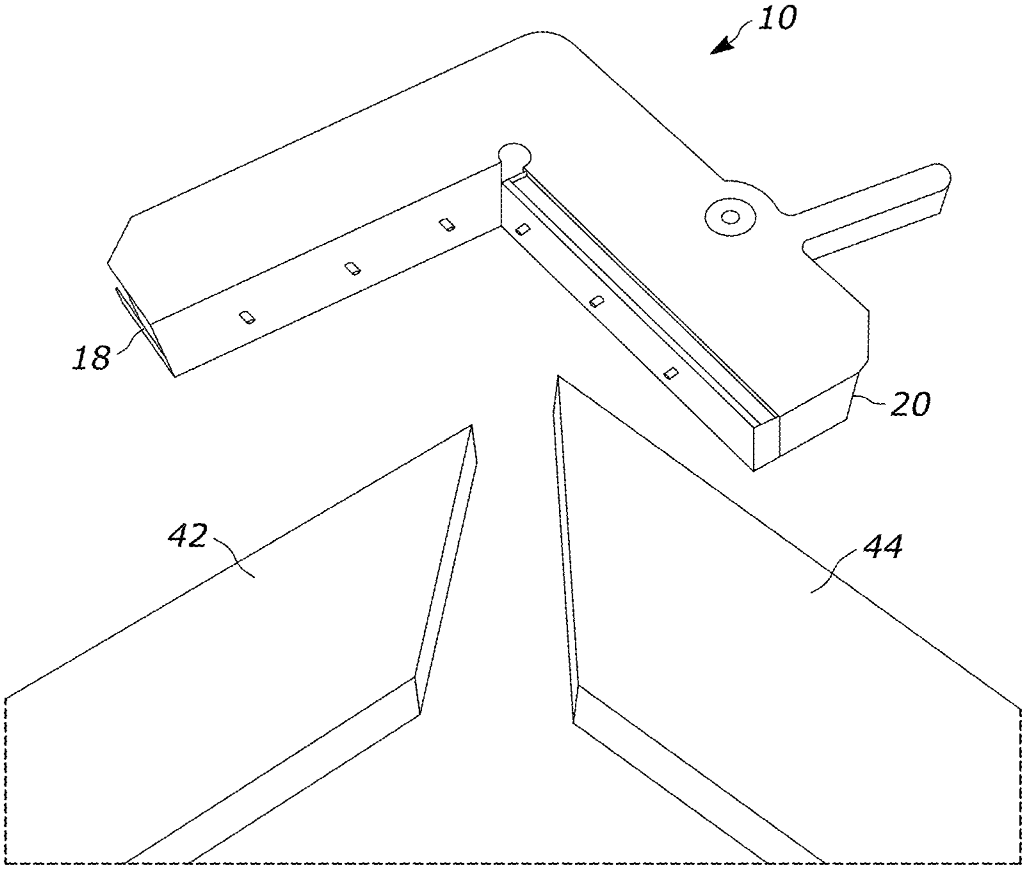
FIG. 10 is a perspective view of the miter clamp tool assembly of the present disclosure along with a first workpiece and a second workpiece to which the miter clamp tool assembly is configured to engage.
Figure 11:
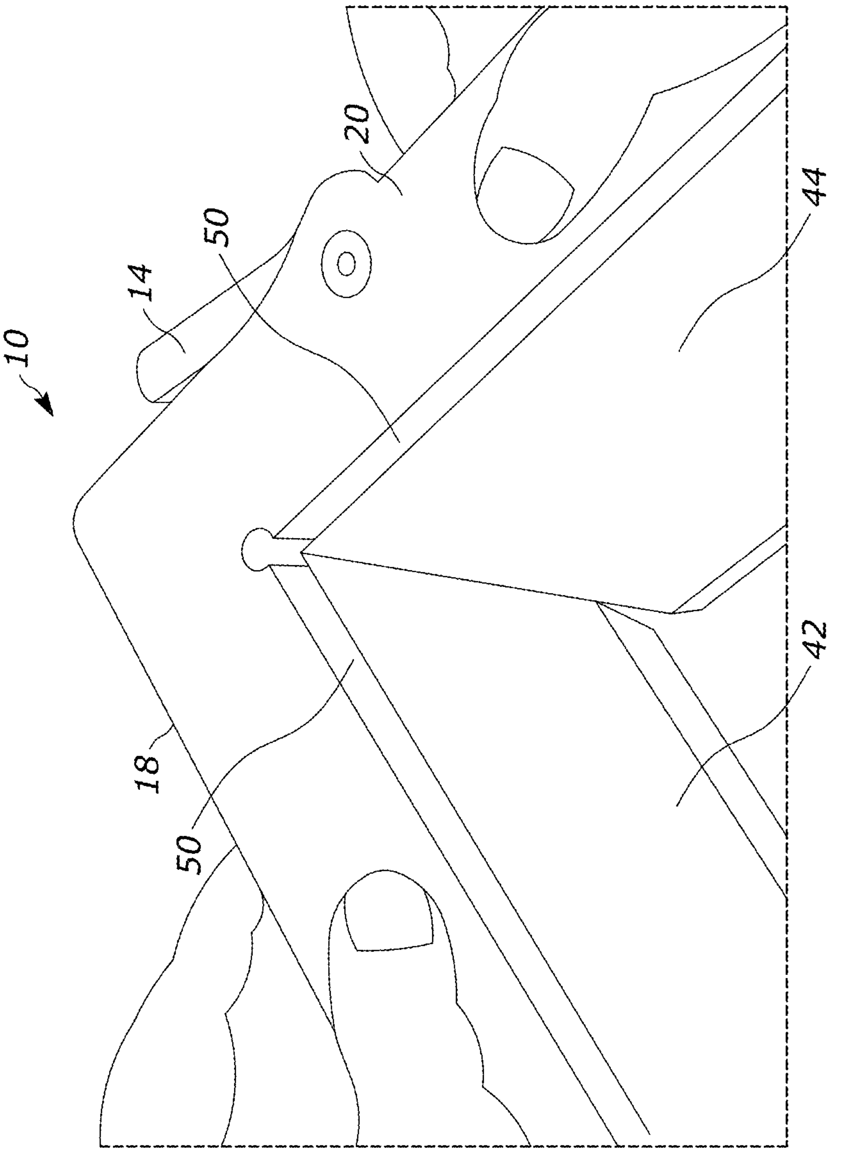
FIG. 11 is a perspective view of the miter clamp tool assembly with the first workpiece and the second workpiece aligned with portions of the miter clamp tool assembly.
Figure 12:
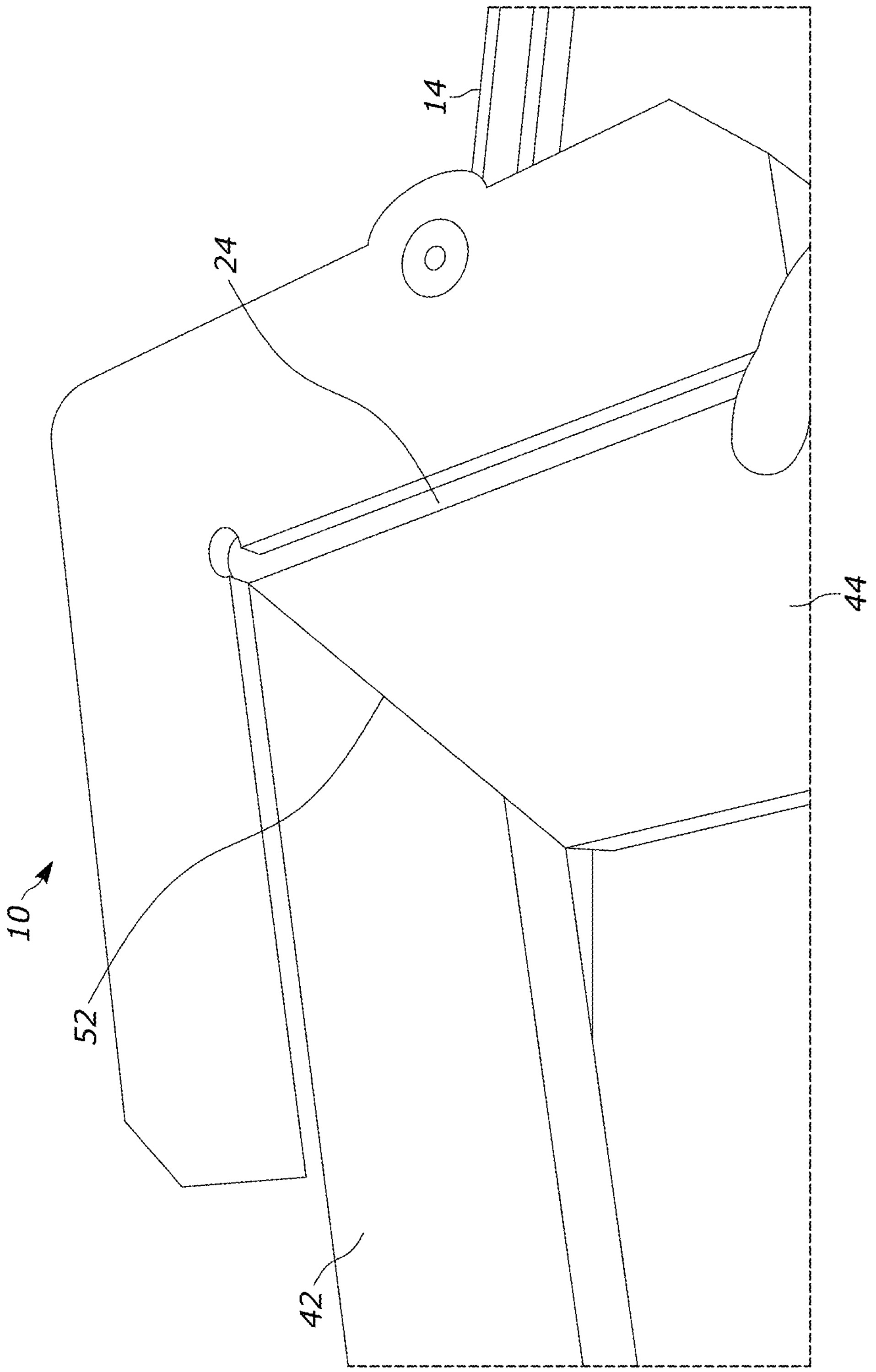
FIG. 12 is a perspective view of the miter clamp tool assembly engaged with the first and second workpieces to secure the first and second workpieces together.

Referring now to FIGS. 10-12, the miter clamp tool assembly 10 of the present disclosure is depicted with a first workpiece 42 and a second workpiece 44 are various stages of operation of the miter clamp tool assembly 10 as explained more below. For example, in FIG. 10, the first workpiece 42 includes an angled edge 42*a* disposed separate from and adjacent to an angled edge 44*a* of the second workpiece 44. In this example, it is desired to secure the first workpiece 42 to the second workpiece 44 using the miter clamp tool assembly 10.

In FIG. 11, the first workpiece 42 is aligned with the first clamp member 18, such that first workpiece 42 is essentially parallel to the first clamp member 18 in this example. In addition, the second workpiece 44 is aligned with the second clamp member 20, such that the second workpiece 44 is also essentially parallel to the second clamp member 20. The lever 14 is in an unactuated position. A gap 50 is formed between each of the first workpiece 42 and the first clamp member 18 and the second workpiece 44 and the second clamp member 20. This illustrates that the lever 14 of the miter clamp tool assembly 10 has not yet been activated and the spring-biased plate 24 of the second clamp member 20 is thus not yet moved to the second position to engage the second workpiece 44.

Referring now to FIG. 12, the lever 14 of the miter clamp tool assembly 10 has been moved from an unactuated position to an actuated position, e.g., rotated in a downward direction, enabling the cam 14*a* of the lever 14 to contact the spring-biased plate 24, e.g., second plate of the second clamp member 20. As a result of the actuation, the spring-biased plate 24 of the second clamp member 20 is moved from the first position to the second position. In addition, the plurality of screws 28 disposed on the spring-biased plate 24 engage a portion of the second workpiece 44, and the plurality of screws 26 disposed on the first plate 22 engage a portion of the first workpiece 42 to secure the first workpiece 42 to the second workpiece 44, forming a miter 52 between the workpieces 42, 44.

At least in view of the foregoing, it will be understood that the miter clamp tool assembly 10 of the present disclosure may operate according to one or more of the following methods. For example, a method of securing workpieces together using the miter clamp tool assembly 10 comprises aligning the first workpiece 42 with the first clamp member 18 of the miter tool clamp assembly 10 and aligning the second workpiece 44 with the second clamp member 20 of the miter tool clamp assembly 10. The method also includes moving the lever 14 of the miter tool clamp assembly 10 from an unactuated position to an actuated position. The method also includes moving the spring-biased plate 24 of the second clamp member 20 from the first position to the second position upon moving the lever 14 of the miter tool clamp assembly 10 from the unactuated position to the actuated position. The method also includes engaging the plurality of screws 28 disposed on the spring-biased plate 24 with a portion of a second workpiece 44 and the plurality of screws 26 disposed on the first plate 22 of the first clamp member 18 with a portion of the first workpiece 42 to secure the first workpiece 42 to the second workpiece 44.

In addition, and in another example, moving the lever 14 of the miter tool clamp assembly 10 from the unactuated position to the actuated position comprises rotating the lever 14 in a direction, such as a downward direction, such that the cam 14*a* of the lever 14 contacts a portion of the spring-biased plate 24 of the second clamp member 20 to move the second clamp member 20. In another example, moving the spring-biased plate 24 of the second clamp member 20 from the first position to the second position upon moving the lever 14 of the miter tool clamp assembly 10 from the unactuated position to the actuated position comprises moving the spring-biased plate 24 from the first position in which the plurality of screws 28 of the spring-biased plate 24 are not in contact with the second workpiece 44 to the second position in which the plurality of screws 28 of the spring-biased plate 24 are in contact and engaged with the portion of the second workpiece 44.

Moreover, and in yet another example, aligning the first workpiece 42 with the first clamp member 18 of the miter tool clamp assembly 10 and the second workpiece 44 with the second clamp member 20 of the miter tool clamp assembly 10 further comprises aligning the first workpiece 42 in a position perpendicular to the second workpiece 44 and parallel to the first clamp member 18 and aligning the second workpiece 44 in a position parallel to the second clamp member 20. In addition, the method may further comprise moving the lever 14 of the miter tool clamp assembly 10 from the actuated position back to the unactuated position after engaging the plurality of screws 28 disposed on the spring-biased plate 24 with a portion of a second workpiece 44 and the plurality of screws 26 disposed on the first plate 22 of the first clamp member 18 with a portion of the first workpiece 18 to secure the first workpiece 42 to the second workpiece 44, and wherein spring-biased members of the spring-biased plate 24 then move the spring-biased plate 24 back into the first position.

At least in view of the foregoing, it will be appreciated that the miter clamp tool assembly 10 and methods of the present disclosure include several advantages. When the lever 14 is actuated and the second plate 24 moved to engage the second workpiece 44, pushing the second workpiece 44 into the first workpiece 42 to secure the first and second workpieces 42, 44 together and form the miter 52, the first and second workpieces 42, 44 are held together so any glue or other sealing, attachment mechanism or adhesive can set. In this way, the miter 52 is formed and the two workpieces 42, 44 are secured together and ready to be pre-installed, rather than try to nail separate workpieces 42, 44 onto a wall or other surface. The formed miter 52 in the secured first and second workpieces 42, 44 lines up better for a cleaner and more professional view once installed. Further, because the top member and the bottom side of the base 12 of the miter clamp tool assembly 10 are flat, and the lever 14 is disposed between the base 12 and the top member 16, the miter clamp tool assembly 10 is able to be disposed and used on any surface, in either direction, allowing more flexibility and adaptability of the tool for various workpieces and/or moldings. Further, having the plurality of screws 28 offset from the central axis allows workpieces of various sizes, shapes, and thicknesses to be easily used with the miter clamp tool assembly 10 of the present disclosure.

The figures and description provided herein depict and describe preferred embodiments of the miter clamp tool assembly and method of the present disclosure for purposes of illustration only. One skilled in the art will readily recognize from the foregoing discussion that alternative embodiments of the components illustrated herein may be employed without departing from the principles described herein. Thus, upon reading this disclosure, those of skill in the art will appreciate still additional alternative structural and functional designs. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the methods and components disclosed herein without departing from the spirit and scope defined in the appended claims.

What is claimed:

1. A miter clamp tool assembly comprising:

a base having a first clamp member and a second clamp member;

a first plate disposed on the first clamp member and a second plate disposed on the second clamp member, each of the first and second plates including a plurality of screws configured to be coupled to a portion of a workpiece to secure the portions of the workpieces together;

a lever disposed on the second clamp member adjacent to the second plate and configured to contact the second plate, the lever including a cam configured to contact the second plate when the lever is actuated;

a top member disposed onto the base to enclose the first and second plates and a portion of the lever, with a portion of the lever extending from the second clamp member between the base and the top member, the portion for actuation.

2. The miter clamp tool assembly of claim 1, wherein the second plate is configured to move from a first position to a second position, and the lever is configured to contact the second plate when the lever is actuated to move the second plate from the first position to the second position.

3. The miter clamp tool assembly of claim 1, wherein at least one of: (1) the first and second clamp members of the base form an integral piece; and (2) the second clamp member is disposed perpendicular to the first clamp member.

4. The miter clamp tool assembly of claim 1, wherein each of the first and second clamp members include at least one post having a bore, and the top member further includes at least one projection configured to be disposed within the bore of the at least one post to secure the top member to the base of the miter clamp tool assembly.

5. The miter clamp tool assembly of claim 1, the second plate further comprising a pair of elongated openings, each elongated opening having a spring biased member that biases the second plate back into the first position after movement into the second position.

6. The miter clamp tool assembly of claim 1, wherein the plurality of screws on the first plate are disposed along a central axis of the first plate.

7. The miter clamp tool assembly of claim 1, wherein the plurality of screws on the second plate are disposed offset from a central axis of the second plate.

8. The miter clamp tool assembly of claim 2, wherein the first position is a position in which the plurality of screws are not engaged with the portion of the workpiece and the lever is in an unactuated state, wherein the second position is a position in which the plurality of screws are engaged with the portion of the workpiece and the lever is in an actuated state.

* * * * *